(12) United States Patent
Adrangi et al.

(10) Patent No.: US 10,123,209 B2
(45) Date of Patent: *Nov. 6, 2018

(54) FILE ENCRYPTION, DECRYPTION AND ACCESS VIA NEAR FIELD COMMUNICATION

(71) Applicant: Intel Corporation, Santa Clara, CA (US)

(72) Inventors: Farid Adrangi, Lake Oswego, OR (US); Sanjay Bakshi, Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/437,307

(22) Filed: Feb. 20, 2017

(65) Prior Publication Data
US 2017/0265078 A1 Sep. 14, 2017

Related U.S. Application Data

(63) Continuation of application No. 13/976,097, filed on Mar. 28, 2014, now Pat. No. 9,699,657.

(51) Int. Cl.
| | |
|---|---|
| *H04W 12/08* | (2009.01) |
| *H04L 29/06* | (2006.01) |
| *G06F 21/62* | (2013.01) |
| *G06F 21/79* | (2013.01) |
| *H04W 12/02* | (2009.01) |
| *H04W 4/80* | (2018.01) |

(52) U.S. Cl.
CPC ........ *H04W 12/08* (2013.01); *G06F 21/6209* (2013.01); *G06F 21/79* (2013.01); *H04L 63/0492* (2013.01); *H04L 63/102* (2013.01); *H04W 4/80* (2018.02); *H04W 12/02* (2013.01); *G06F 2221/2153* (2013.01)

(58) Field of Classification Search
CPC .......................... H04W 12/08; G06F 21/6209
USPC ...................................................... 713/165
See application file for complete search history.

(56) References Cited

U.S. PATENT DOCUMENTS

| | | | |
|---|---|---|---|
| 2011/0276802 A1* | 11/2011 | Roberts | H04L 63/0492 713/171 |
| 2012/0021684 A1* | 1/2012 | Schultz | H04B 5/0043 455/41.1 |

* cited by examiner

*Primary Examiner* — Anthony D Brown
(74) *Attorney, Agent, or Firm* — Schiff Hardin LLP

(57) ABSTRACT

Methods and devices for NFC-tap file encryption, decryption and access via Near Field Communication (NFC) are disclosed. A user can select an unencrypted file stored in a computing device for encryption. Upon encryption, the file name of the selected file and the encryption key used to encrypt the selected file are transmitted to an NFC-enabled wireless device for storage. The user can select an encrypted file stored in the computing device for access. As the user taps the computing device with the wireless device, the file name of the selected file is transmitted to the wireless device, which in turn transmits a decryption key for decrypting the selected file to the computing device. The computing device decrypts the selected file with the decryption key. The user can now access the decrypted file.

28 Claims, 5 Drawing Sheets

FILE ENCRYPTION, DECRYPTION AND ACCESS VIA NEAR FIELD COMMUNICATION

BACKGROUND

Encryption is commonly used by businesses, government agencies and individuals to render the encrypted data unreadable to anyone except those possessing special knowledge, such as a decryption key. As many data files are stored in the hard disk of computing devices such as a personal computer, hard disk encryption is used to prevent unauthorized access to confidential or restricted files on the computing device. Typically, the entire hard disk is decrypted upon successful system boot with the user's access code. Once the computing device is in a working state (e.g., the Advanced Configuration and Power Interface (ACPI) state S0) and completely booted, unauthorized access may nevertheless occur as all files on the hard disk are decrypted. For example, when the computing device is left unattended, an attacker may gain access to the computing device remotely. To protect against such unauthorized access, users tend to resort to password-protecting sensitive files.

However, this approach is not without its problems. For example, a password may be easy for the user to remember but not strong enough and hence prone to be cracked by an attacker. As another example, the user may select, remember or exchange a password via an insecure email. Besides, from the perspective of user-friendliness, it is not optimal that the user needs to remember and manually enter the password.

Near Field Communication (NFC) is a standards-based connectivity technology that establishes wireless connection between two devices in close proximity of each other, typically in the order of a few centimeters. NFC allows users to transfer information by touching, or tapping, one device with another device. As with proximity card technology, NFC uses magnetic induction between two loop antennas located within two NFC-enabled devices that are within close proximity of each other, effectively forming an air-core transformer. The act of bringing one NFC-enabled device to close proximity of another FC-enabled device with or without the two devices physically contacting each other, is referred to as an "NFC tap" or "one tap" operation hereinafter. With an NFC tap operation, a user can conveniently perform a variety of tasks, including mobile payment, secure login, wireless pairing and implementing a user-friendly mechanism for triggering peer-to-peer data exchange between two NFC-enabled devices.

BRIEF DESCRIPTION OF THE DRAWINGS

The detailed description is described with reference to accompanying FIGURES. In the FIGURES, the left-most digit(s) of a reference number identifies the FIGURE in which the reference number first appears. The same numbers are used throughout the drawings to reference like features and components.

DETAILED DESCRIPTION

Overview

Described herein are architectures, platforms, methods, and other technologies that enable NFC-tap file encryption, decryption and access. The techniques described herein leverage the NFC technology to allow a user to indicate access authorization for one or more user-selected files. Each user can have secure access to individual files on a computing device. Unauthorized access to sensitive, critical files while the computing device is in an active state (e.g., ACPI S0) is prevented even when the computing device is stolen or left unattended. The user is not required to select, remember or exchange a password via an insecure email.

The disclosed techniques provide a framework where sensitive files and critical files can stay encrypted after the computing device transitions to ACPI state S0 yet can also be easily accessed once the user taps his smartphone or NFC card (including the access code) on the computing device. A user can select an unencrypted file stored in a computing device for encryption. Upon encryption, the file name of the selected file and the encryption key used to encrypt the selected file are transmitted to an NFC-enabled wireless device for storage. The user can select an encrypted file stored in the computing device for access. As the user taps the computing device with the wireless device, the file name of the selected file is transmitted to the wireless device, which in turn transmits a decryption key for decrypting the selected file to the computing device. The computing device decrypts the selected file with the decryption key. The user can now access the decrypted file.

The disclosed techniques provide another level of file access security. If an un-attended computing device is stolen while in ACPI S0, the thief would not have access to the critical files. While the user is logged on the computing device, unauthorized access to encrypted files on the computing device will be prevented. Additionally, the user is not required to select and remember any password to protect the files as files selected for protection will be encrypted with automatically generated encryption key.

Example Framework

Figure 1:
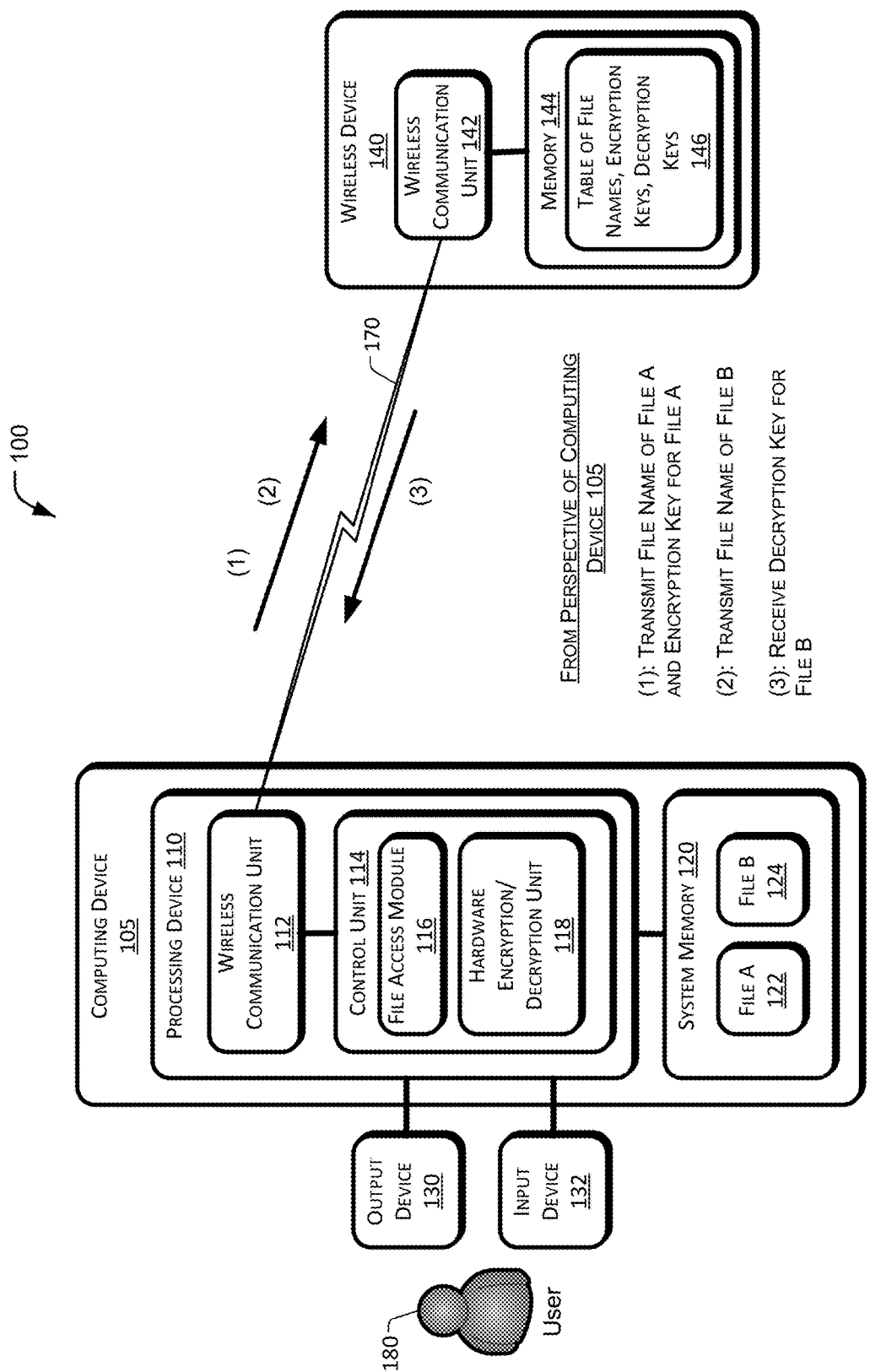
FIG. 1 is a block diagram illustrating an example framework implementing NFC-tap file encryption, decryption and access via NFC technology in accordance with the present disclosure.

FIG. 1 illustrates an example framework 100 that implements NFC-tap file encryption, decryption and access between a wireless device 140 and a computing device 105. In an implementation, both the computing device 105 and the wireless device 140 are equipped with necessary hardware and/or software to enable them to establish a communication link 170 based on the NFC technology. As an example for illustrative purpose, the computing device 105 may be an NFC-enabled notebook computer or laptop computer, and the wireless device 140 may be an NFC-enabled smartphone or an NFC card. When the wireless device 140 is in close proximity of the computing device 105, information exchange between the wireless device 140 and the computing device 105 occurs through the NFC-based communication link 170. This is called an NFC tap.

The computing device 105 may include a processing device 110 and system memory 120 coupled to the processing device 110. The processing device 110 may include a wireless communication unit 112 and a control unit 114 coupled to the wireless communication unit 112. The system memory 120 may have software applications and data stored therein, such as file A 122 and file B 124 as illustrated in FIG. 1. Those ordinarily skilled in the art would appreciate that, although a set number of data files are shown in FIG. 1, in various implementations the number of applications and data files stored in the system memory 120 may differ. In some embodiments, the processing device 110 and the system memory 120 may be integral parts of an integrated circuit, or chip.

Alternatively, the processing device 110 and the system memory 120 may be implemented in separate integrated circuits. In some embodiments, the control unit 114 and the wireless communication unit 112 may be integral parts of a chip. Alternatively, the control unit 114 and the wireless communication unit 112 may be implemented in separate chips, as in a chipset. In some embodiments, the processing device 110 may include hardware, firmware, software, or a combination thereof. In some embodiments, some of the hardware components of the processing device 110 may include discrete electronic components on a printed circuit board.

The computing device 105 may also include an output device 130 and an input device 132. The output device 130 outputs information to a user 180 either visually or audibly, or both visually and audibly. The input device 132 receives input from the user 180. Although the output device 130 and the input device 132 are illustrated in FIG. 1 as being separate from each other, in some embodiments the output device 130 and the input device 132 may be integral parts of an input/output device. Although the output device 130 and the input device 132 are illustrated in FIG. 1 as being detachably coupled to the computing device 105, in some embodiments the output device 130 and the input device 132 may be integral parts of the computing device 105.

The wireless communication unit 112 can establish wireless communication with one or more wireless devices, such as the wireless device 140, to receive information from the wireless device 140 and transmit information to the wireless device 140 via the NFC-based communication link 170.

The control unit 114 can examine information received by the wireless communication unit 112 from one or more wireless devices, such as information transmitted from the wireless device 140 for example. The control unit 114 can verify whether the wireless device from which the examined information is received is an authorized device. For example, the information received from the wireless device 140 may contain identification of the wireless device 140, e.g., a plain language description, a name given by its user, a serial number, a Media Access Control (MAC) number or the like.

The control unit 114 may compare such identification with a table of identifications of devices that are authorized by a user of the computing device 105 to establish communication with the computing device 105. When there is a match between the identification of the wireless device 140 and the identification of an authorized device, the control unit 114 verifies the wireless device 140 as an authorized device, and further communication and operations may ensue. In an event that the wireless device 140 is not verified as an authorized device, the control unit 114 may prevent any action by the computing device 105 or any part thereof from being triggered by the wireless device 140.

The control unit 114 can receive a first input indicative of a selection of a first file for access while the first file is encrypted. For example, when the user 180 desires to access an encrypted file, e.g., file A 122, the user 180 makes an input to select file A 122 via the input device 132. Consequently, the processing device 110, and hence the control unit 114, receives such user input. The control unit 114 can direct the wireless communication unit 112 to transmit a file name of the first file to the wireless device 140 based on the NFC technology. For example, upon receiving the user's input indicative of the intent of the user 180 to access file A 122 which is encrypted, the control unit 114 transmits the file name of file A 122 to the wireless device 140 via the wireless communication unit 112.

The control unit 114 can receive, via the wireless communication unit 112, a first decryption key for the first file from the wireless device 140 in response to transmitting the file name of the first file to the wireless device 140. For example, the wireless device 140, whether a smartphone or an NFC card, may include a wireless communication unit 142 and memory 144 coupled to the wireless communication unit 142. The memory 144 may store a file, list or table of file names, encryption keys and decryption keys 146. Upon receiving the file name of file A 122, the wireless device 140 locates the file name of file A 122, and the corresponding decryption key, in the table 146 and transmits the decryption key of file A 122 back to the wireless communication unit 110 of the computing device 105. Accordingly, the control unit 114 receives, via the wireless communication unit 112, the decryption key for the file A 122 from the wireless device 140. The control unit 114 can decrypt the first file using the first decryption key. For example, once the control unit 114 receives the decryption key for file A 122 from the wireless device 140, the control unit 114 proceeds to decrypt file A 122 using the decryption key.

The control unit 114 can receive a second input indicative of a selection of a second file for encryption. For example, when the user 180 desires to encrypt file B 124, which the user 180 may determine to be a critical or sensitive file, the user 180 makes an input to select file B 124 via the input device 132. Consequently, the processing device 110, and hence the control unit 114, receives such user input. The control unit 114 can generate a second encryption key for the second file and then encrypt the second file using the second encryption key. For example, upon receiving the user input indicative of the intent of the user 180 to encrypt file B 124, the control unit 114 generates an encryption key for file B 124 and then encrypts file B 124 using the generated encryption key. The control unit 114 can direct the wireless communication unit 112 to transmit a file name of the second file and the second encryption key to the wireless device 140 based on the NFC technology. For example, once file B 124 is encrypted, the control unit 114 transmits the file name of file B 124 and the encryption key generated for file B 124 to the wireless device 140 via the wireless communication unit 112 for the wireless device 140 to store therein the encryption key generated for file B 124.

In some embodiments, the control unit 114 may employ a symmetric key algorithm in encrypting files. In such case, the encryption algorithm uses the same key for both encryption and decryption of a file. In some embodiments, the control unit 114 may employ an asymmetric key algorithm in encrypting files. In such case, the encryption algorithm uses an encryption key for encryption and a decryption key that is different from the encryption key to decrypt the encrypted files. Accordingly, the control unit 114 may generate a second decryption key for the second file, and direct the wireless communication unit to transmit the file name of the second file and the second decryption key to the wireless device based on the NFC technology. For example, in case the control unit 114 uses an asymmetric key algorithm to encrypt files, the control unit 114 also generates a decryption key for file B 124 when the control unit 114 generates the encryption key for file B 124. Besides the encryption key, the control unit 114 also transmits the decryption key to the wireless device 140 for storage.

In some embodiments, the encryption and decryption of files may be carried out by a hardware-based file encryption/decryption engine. The hardware-based engine may be a part of the control unit 114, such as the hardware encryption/decryption unit 118 as shown in FIG. 1. In other embodiments, the encryption and decryption of files may be carried out by a software file access application. The software file access application may be implemented as the file access module 116 as shown in FIG. 1. The file access module 116 may be controlled by the control unit 114 to encrypt and decrypt files. The file access module 116 may also provide a user interface to receive input from the user 180 and provide information to the user 180 via the output device 130.

With respect to file decryption, the file access module 116 can decrypt the file A 122 using the decryption key for the file A 122. The file access module 116 can receive the first input from the user and provide file information to an output device, which outputs the file information to a user, where the file information representative of one or more files selectable by the user including the first file. For example, the file access module 116, as a user interface, receives the input from the user 180 indicative of the user's intent to access file A 122 which is encrypted. After file A 122 is decrypted, the file access module 116 provides information to the output device 130 to inform the user 180 that file A 122 is now decrypted and accessible by the user 180. With respect to file encryption, the file access module 116 can encrypt a second file selected by the user. For example, the file access module 116 encrypts file B 124 with the encryption key of file B 124.

The above description of the file access module 116 is applicable to the hardware encryption/decryption unit 118 for those embodiments where the encryption and decryption of files is done by a hardware-based encryption/decryption engine such as the hardware encryption/decryption unit 118. In the interest of brevity, detailed description will not be repeated.

Example Methods

Figure 2:
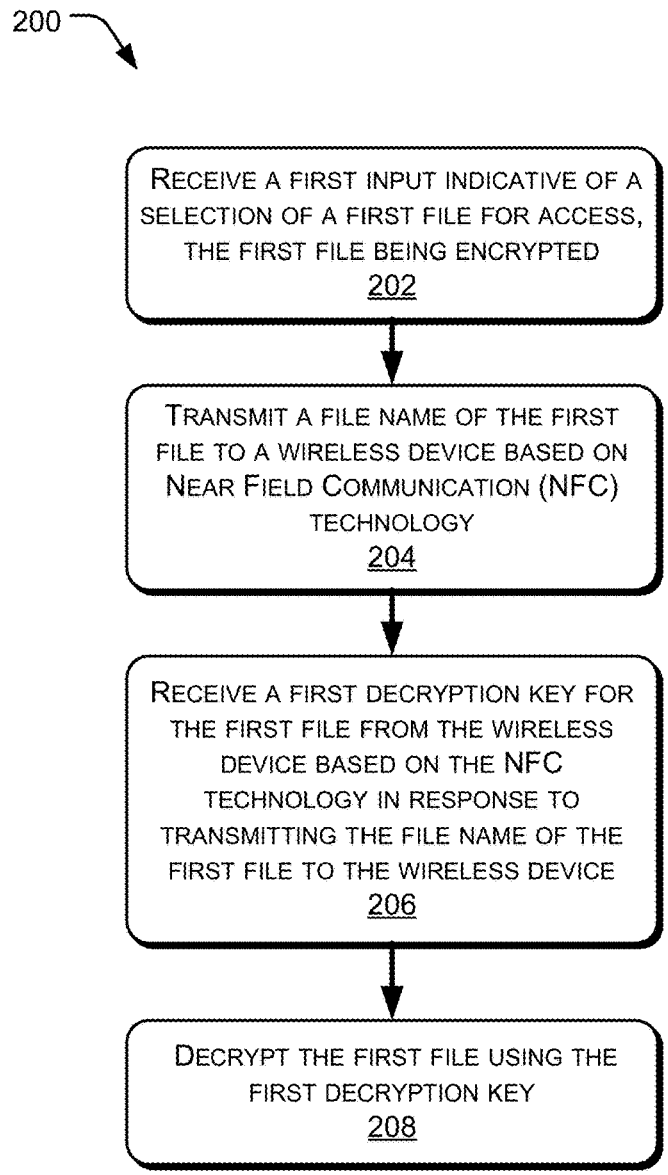
FIG. 2 is a flowchart illustrating an example method for one-tap file decryption and access in accordance with the present disclosure.

FIG. 2 illustrates an example method 200 for NFC-tap file decryption and access.

At block 202, the method 200 receives a first input indicative of a selection of a first file for access, and the first file is encrypted. For example, when the user 180 desires to access an encrypted file, e.g., file A 122, the user 180 makes an input to select file A 122 via the input device 132. Subsequently, the processing device 110, and hence the control unit 114, receives such user input.

At block 204, the method 200 transmits a file name of the first file to a wireless device based on the NFC technology. For example, upon receiving the user's input indicative of the intent of the user 180 to access file A 122 which is encrypted, the control unit 114 transmits the file name of file A 122 to the wireless device 140 via the wireless communication unit 112.

At block 206, the method 200 receives a first decryption key for the first file from the wireless device based on the NFC technology in response to transmitting the file name of the first file to the wireless device. For example, the control unit 114 receives, via the wireless communication unit 112, the decryption key for the file A 122 from the wireless device 140.

At block 208, the method 200 decrypts the first file using the first decryption key. For example, once the control unit 114 receives the decryption key for file A 122 from the wireless device 140, the control unit 114 proceeds to decrypt file A 122 using the decryption key.

In some embodiments, the method 200 encrypts and decrypts selected files by hardware. For example, the control unit 114 may include the hardware encryption/decryption unit 118 that can encrypt and decrypt files that are selected by the user 180 to be encrypted or decrypted. Alternatively, the method 300 encrypts and decrypts selected files by software. For example, the control unit 114 may include the software file access module 116 that can encrypt and decrypt files that are selected by the user 180 to be encrypted or decrypted.

In some embodiments, the method 200 may provide notification to the user indicating that the second file is decrypted or accessible. For example, the control unit 114, or the file access module 116, can send a visual or audible message to the user 180 via the output device 130 to notify the user 180 that file B 124 is decrypted and hence accessible.

In some embodiments, the method 200 may start a file access application on a computing device and display file information to a user with the file information being representative of one or more files selectable by the user including the first file. For example, when the computing device 105 includes the file access module 116 and the file access module 116 also functions as a user interface, the file access module 116 can display, via the output device 130, information to the user 180 showing the file A 122 and file B 124 that are selectable by the user 180 for encryption or decryption.

In some embodiments, the method 200 may provide an indication to user such that the user is prompted by the indication to bring the wireless device to close proximity of a computing device where the first file is stored upon decrypting the first file. The method 200 may further detect a presence of the wireless device such that the detecting the presence of the wireless device results in transmitting the file name of the first file to the wireless device based on the NFC technology. For example, the control unit 114 can send a visual or audible message to the user 180 via the output device 130 to prompt the user 180 to tap the wireless device 140 on the computing device 105 to initiate information exchange between the computing device 105 and the wireless device 140 via the NFC-based communication link 170. When the user 180 brings the wireless device 140 to close proximity of the computing device 105, the presence of the wireless device 140 is detected by the NFC-enabled wireless communication unit 112.

Figure 3:
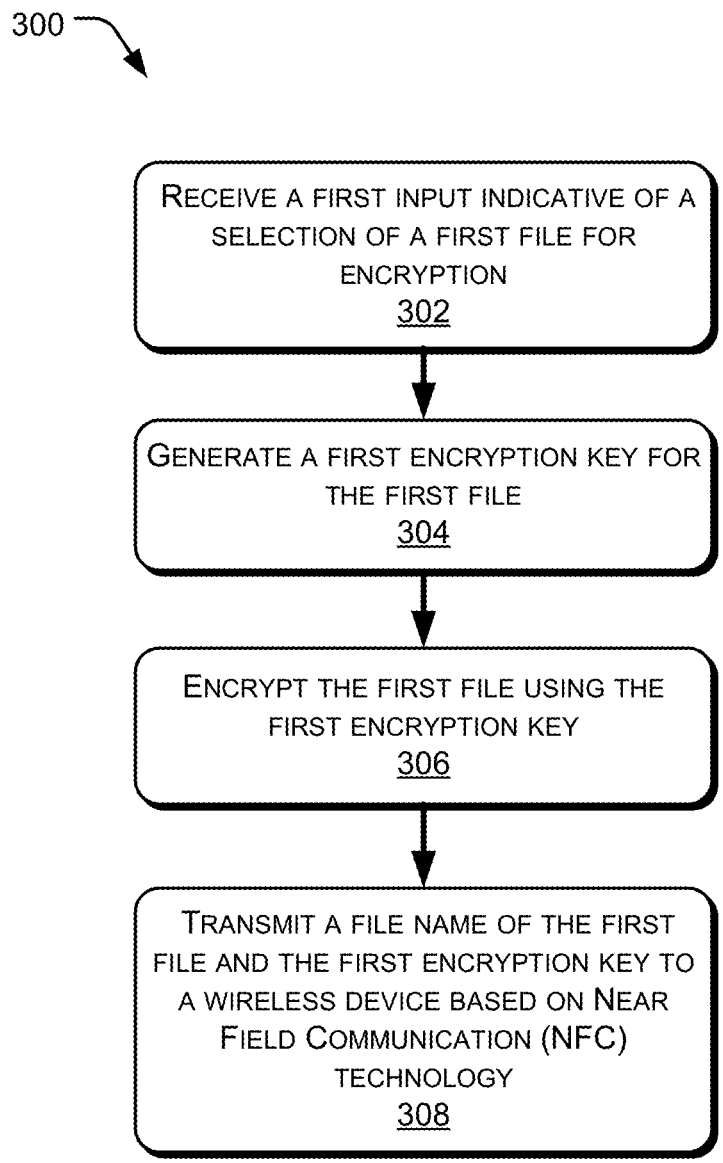
FIG. 3 is a flowchart illustrating another example method for NFC-tap file encryption in accordance with the present disclosure.

FIG. 3 illustrates another example method 300 for NFC-tap file encryption via NFC.

At block 302, the method 300 receives a first input indicative of a selection of a first file for encryption. For example, when the user 180 desires to encrypt file B 124, which the user 180 may determine to be a critical or sensitive file, the user 180 makes an input to select file B 124 via the input device 132. Consequently, the processing device 110, and hence the control unit 114, receives such user input.

At block 304, the method 300 generates a first encryption key for the first file. For example, upon receiving the user input indicative of the intent of the user 180 to encrypt file B 124, the control unit 114 generates an encryption key for file B 124 and then encrypts file B 124 using the generated encryption key.

At block 306, the method 300 encrypts the first file using the first encryption key. For example, the control unit 114 encrypts file B 124 using the generated encryption key.

At block 308, the method 300 transmits a file name of the first file and the first encryption key to a wireless device based on the NFC technology. For example, once file B 124 is encrypted, the control unit 114 transmits the file name of file B 124 and the encryption key generated for file B 124 to the wireless device 140 via the wireless communication unit 112 for the wireless device 140 to store therein the encryption key generated for file B 124.

In some embodiments, the method 300 may generate the first encryption key and a first decryption key for the first file when the first file is to be encrypted. Accordingly, the method 300 may transmit the file name of the first file, the first encryption key and the first decryption key to a wireless device. For example, in case the control unit 114 uses an asymmetric key algorithm to encrypt files, the control unit 114 also generates a decryption key for file B 124 when the control unit 114 generates the encryption key for file B 124. Besides the encryption key, the control unit 114 also transmits the decryption key to the wireless device 140 for storage.

In some embodiments, the method 300 encrypts and decrypts selected files by hardware. For example, the control unit 114 may include the hardware encryption/decryption unit 118 that can encrypt and decrypt files that are selected by the user 180 to be encrypted or decrypted. Alternatively, the method 300 encrypts and decrypts selected files by software. For example, the control unit 114 may include the software file access module 116 that can encrypt and decrypt files that are selected by the user 180 to be encrypted or decrypted.

In some embodiments, the method 300 may start a file access application on a computing device and display file information to a user with the file information being representative of one or more files selectable by the user including the first file. For example, when the computing device 105 includes the file access module 116 and the file access module 116 also functions as a user interface, the file access module 116 can display, via the output device 130, information to the user 180 showing the file A 122 and file B 124 that are selectable by the user 180 for encryption or decryption.

In some embodiments, the method 300 may provide an indication to user such that the user is prompted by the indication to bring the wireless device to close proximity of a computing device where the first file is stored upon encrypting the first file. The method 200 may further detect a presence of the wireless device such that the detecting the presence of the wireless device results in transmitting the file name of the first file and the encryption key to the wireless device based on the NFC technology. For example, the control unit 114 can send a visual or audible message to the user 180 via the output device 130 to prompt the user 180 to tap the wireless device 140 on the computing device 105 to initiate information exchange between the computing device 105 and the wireless device 140 via the NFC-based communication link 170. When the user 180 brings the wireless device 140 to close proximity of the computing device 105, the presence of the wireless device 140 is detected by the NFC-enabled wireless communication unit 112.

The method 300 may further receive a second input indicative of a selection of a second file for access, the second file being encrypted, transmit a file name of the second file to the wireless device based on the NFC technology, receive a second decryption key for the second file from the wireless device based on the NFC technology in response to transmitting the file name of the second file to the wireless device, and decrypt the second file using the second decryption key. For example, when the user 180 desires to access an encrypted file, e.g., file B 124, the user 180 makes an input to select file B 124 via the input device 132. Subsequently, the processing device 110, and hence the control unit 114, receives such user input. Upon receiving the user's input indicative of the intent of the user 180 to access file B 124 which is encrypted, the control unit 114 transmits the file name of file B 124 to the wireless device 140 via the wireless communication unit 112. The control unit 114 receives, via the wireless communication unit 112, the decryption key for the file B 124 from the wireless device 140. Once the control unit 114 receives the decryption key for file B 124 from the wireless device 140, the control unit 114 proceeds to decrypt file B 124 using the decryption key.

The method 300 may further provide notification to the user indicating that the second file is decrypted or accessible. For example, the control unit 114, or the file access module 116, can send a visual or audible message to the user 180 via the output device 130 to indicate that the file B 124 is decrypted and hence accessible.

Figure 4:
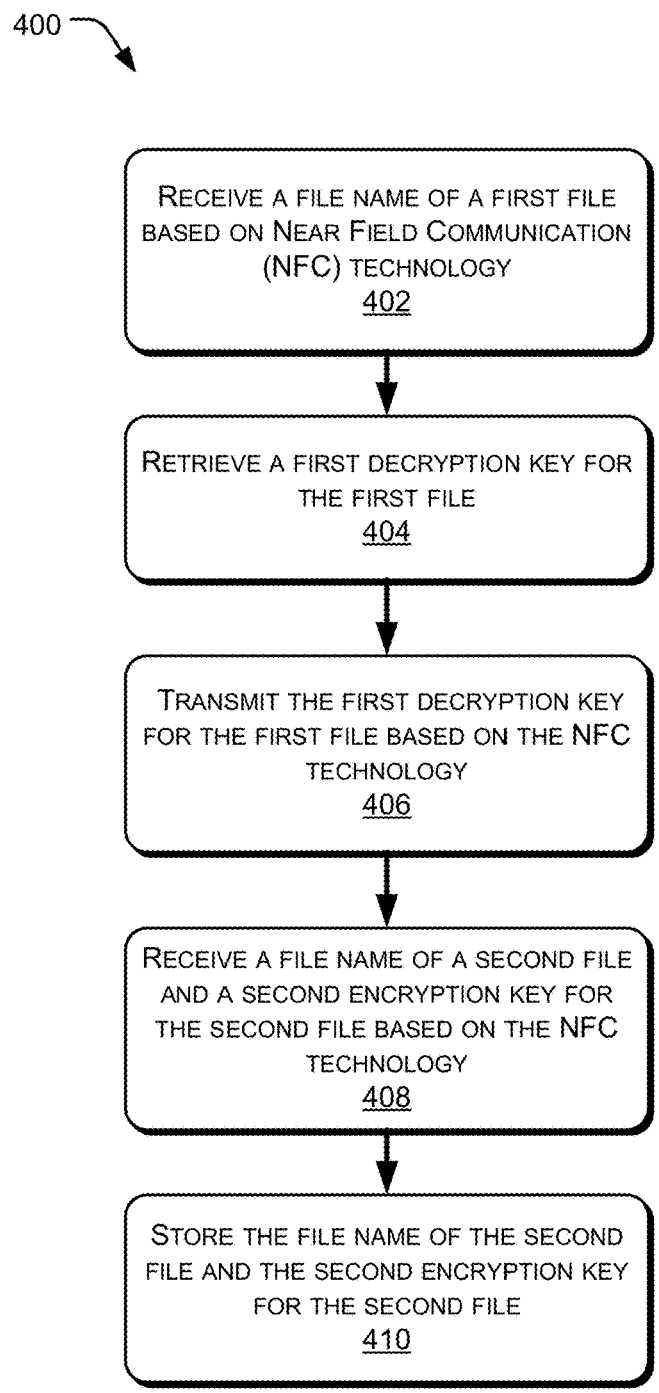
FIG. 4 is a flowchart illustrating still another example method in accordance with the present disclosure.

FIG. 4 illustrates an example method 400 for NFC-tap file decryption and access.

At block 402, the method 400 receives a file name of a first file based on the NFC technology. For example, upon receiving the user's input indicative of the intent of the user 180 to access file A 122 which is encrypted, the control unit 114 transmits the file name of file A 122 to the wireless device 140 via the wireless communication unit 112. That is, the wireless communication unit 142 of the wireless device 140 receives the file name of the first file from the wireless communication unit 112 of the computing device 105 based on the NFC technology.

At block 404, the method 400 retrieves a first decryption key for the first file. For example, upon receiving the file name of file A 122, the wireless device 140 locates the file name of file A 122, and the corresponding decryption key, in the table 146 and retrieves the decryption key for file A 122.

At block 406, the method 400 transmits the first decryption key for the first file based on the NFC technology. For example, the wireless communication unit 142 of the wireless device 140 transmits the decryption key for file A 122 back to the wireless communication unit 110 of the computing device 105.

In some embodiments, the first decryption key for the first file encrypts the first file and decrypts the first file. For example, the first decryption key may be used for encrypting file A 122 as well as for decrypting file A 122.

In some embodiments, the first decryption key for the first file decrypts the first file but does not encrypt the first file. For example, the first decryption key may be used for decrypting file A 122 but not for encrypting file A 122.

The method 400 may optionally execute one or more operations.

At block 408, the method 400 receives a file name of a second file and a second encryption key for the second file based on the NFC technology. For example, the wireless communication unit 142 of the wireless device 140 receives the file name of file B 124 and the encryption key for file B 124 from the wireless communication unit 112 of the computing device 105 based on the NFC technology.

At block 410, the method 400 stores the file name of the second file and the second encryption key for the second file. For example, the wireless device 140 stores the file name of file B 124 and the encryption key for file B 124 in the table 146.

In some embodiments, the second encryption key for the second file encrypts the second file and decrypts the second file. For example, the second encryption key may be used for encrypting file B 124 as well as for decrypting file B 124.

In some embodiments, the second encryption key for the second file encrypts the second file but does not decrypt the second file. For example, the second encryption key may be used for encrypting file B 124 but not for decrypting file B 124.

Example Computing Device

Figure 5:
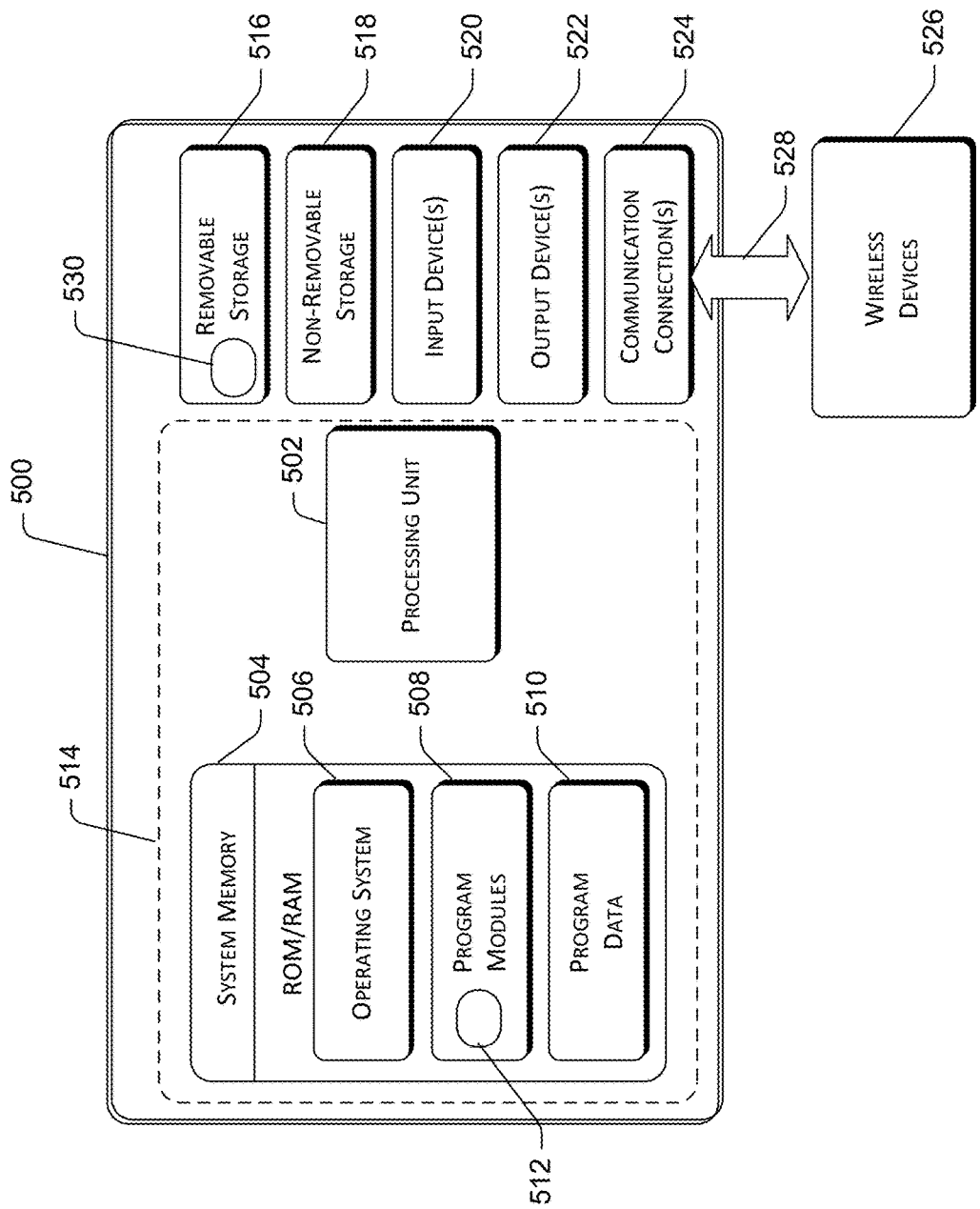
FIG. 5 is a block diagram illustrating an example-computing device that implements a NFC-tap file encryption, decryption and access via NFC technology in accordance with the present disclosure.

FIG. 5 illustrates an example computing device 500 that implements the scheme of NFC-tap file encryption, decryption and access. However, it will be readily appreciated that the techniques disclosed herein may be implemented in other computing devices, systems, and environments. The computing device 500 shown in FIG. 5 is one example of a computing device and is not intended to suggest any limitation as to the scope of use or functionality of the computer and network architectures.

In at least one implementation, computing device 500 typically includes at least one processing unit 502 and system memory 504. Depending on the exact configuration and type of computing device, system memory 504 may be volatile (such as RAM), non-volatile (such as ROM, flash memory, etc.) or some combination thereof. System memory 504 may include an operating system 506, one or more program modules 508, and may include program data 510. A basic implementation of the computing device 500 is demarcated by a dashed line 514.

The program module 508 may include a module 512 configured to implement the one-tap connection and synchronization scheme as described above. For example, the module 512 may carry out one or more of the method 200, method 300 and method 400, and variations thereof, e.g., the computing device 500 acting as described above with respect to the computing device 105 or the wireless device 140.

Computing device 500 may have additional features or functionality. For example, computing device 500 may also include additional data storage devices such as removable storage 516 and non-removable storage 518. In certain implementations, the removable storage 516 and non-removable storage 518 are an example of computer accessible media for storing instructions that are executable by the processing unit 502 to perform the various functions described above. Generally, any of the functions described with reference to the FIGURES can be implemented using software, hardware (e.g., fixed logic circuitry) or a combination of these implementations. Program code may be stored in one or more computer accessible media or other computer-readable storage devices. Thus, the processes and components described herein may be implemented by a computer program product. As mentioned above, computer accessible media includes volatile and non-volatile, removable and non-removable media implemented in any method or technology for storage of information, such as computer readable instructions, data structures, program modules, or other data. The terms "computer accessible medium" and "computer accessible media" refer to non-transitory storage devices and include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium that can be used to store information for access by a computing device, e.g., computing device 500 and computing device 105. Any of such computer accessible media may be part of the computing device 500.

In one implementation, the removable storage 516, which is a computer accessible medium, has a set of instructions 530 stored thereon. When executed by the processing unit 502, the set of instructions 530 cause the processing unit 502, or the processing unit 502 and one or more processors, to execute operations, tasks, functions and/or methods as described above, including method 200, method 300 and method 400, and any variations thereof.

Computing device 500 may also include one or more input devices 520 such as keyboard, mouse, pen, voice input device, touch input device, etc. Computing device 500 may additionally include one or more output devices 522 such as a display, speakers, printer, etc.

Computing device 500 may also include one or more communication connections 524 that allow the computing device 500 to communicate wirelessly with one or more other wireless devices, over wireless connection 528 based on NFC, Wi-Fi, Bluetooth, RF or a combination thereof.

It is appreciated that the illustrated computing device 500 is one example of a suitable device and is not intended to suggest any limitation as to the scope of use or functionality of the various embodiments described. Other well-known computing devices, systems, environments and/or configurations that may be suitable for use with the embodiments include, but are not limited to personal computers, server computers, hand-held or laptop devices, multiprocessor systems, microprocessor-based systems, set top boxes, game consoles, programmable consumer electronics, network PCs, minicomputers, mainframe computers, distributed computing environments that include any of the above systems or devices, and/or the like.

Other Implementation Details and Notes

In the Detailed Description, numerous specific details are set forth in order to provide a thorough understanding of the present disclosure. However, those of ordinary skill in the art would appreciate that the present disclosure may be practiced without these specific details. In other instances, well-known methods, procedures, components and circuits have not been described in detail so as not to obscure the present disclosure.

For each method described in the present disclosure, the order in which the method blocks is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the present disclosure.

Realizations in accordance with the present disclosure have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the present disclosure as defined in the claims that follow.

What is claimed is:

1. A method comprising:
   transmitting a file name of a first file to a wireless device in accordance with a near field communication (NFC) protocol, the first file being encrypted;
   in response to transmitting the file name of the first file to the wireless device, receiving a first decryption key for the first file from the wireless device in accordance with an NFC protocol; and
   decrypting the first file using the first decryption key.

2. The method of claim 1, wherein decrypting the first file comprises decrypting the first file using hardware.

3. The method of claim 1, wherein decrypting the first file comprises decrypting the first file by software.

4. The method of claim 1, further comprising:
   executing a file access application on a computing device from which the file name was transmitted and upon which the first file is stored; and
   displaying file information on the computing device, the file information indicating one or more selectable files including the first file.

5. The method of claim 1, wherein the computing device upon which the first file is stored executes an asymmetric key algorithm, and further comprising:
   transmitting a first encryption key to the wireless device associated with encryption of the first file, the first encryption key being different than the first decryption key.

6. The method of claim 1, further comprising:
   prior to transmitting the file name of the first file to the wireless device:
   receiving information from the wireless device in accordance with an NFC protocol;
   verifying whether the wireless device is an authorized device based upon the received information; and
   transmitting the file name of the first file to the wireless device only when the wireless device is authorized.

7. The method of claim 6, wherein the information received from the wireless device uniquely identifies the wireless device, and
   wherein the act of verifying whether the wireless device is an authorized device includes comparing the unique identification of the wireless device to a table of devices authorized to communicate with a computing device upon which the first file is stored.

8. A method comprising:
   encrypting a first file using a first encryption key to provide an encrypted first file;
   transmitting a file name of the encrypted first file to a wireless device in accordance with a near field communication (NFC) protocol;
   in response to transmitting the file name of the first file to the wireless device, receiving a first decryption key for the encrypted first file from the wireless device in accordance with a near field communication (NFC) protocol; and
   decrypting the encrypted first file using the first decryption key.

9. The method of claim 8, wherein encrypting the first file comprises encrypting the encrypted first file by hardware.

10. The method of claim 8, wherein encrypting the first file comprises encrypting the first file by software.

11. The method of claim 8, further comprising:
    executing a file access application on a computing device from which the file name was transmitted and upon which the encrypted first file is stored; and
    displaying file information on the computing device, the file information indicating one or more selectable files including the encrypted first file.

12. The method of claim 8, further comprising:
    wherein the act of encrypting the first file includes encrypting the first file in accordance with an asymmetric key algorithm such that the first encryption key and the first decryption key are different than one another.

13. The method of claim 8, further comprising:
    prior to transmitting the file name of the encrypted first file to the wireless device:
    receiving information from the wireless device in accordance with an NFC protocol;
    verifying whether the wireless device is an authorized device based upon the received information; and
    transmitting the file name of the encrypted first file to the wireless device only when the wireless device is authorized.

14. The method of claim 13, wherein the information received from the wireless device uniquely identifies the wireless device, and
    wherein the act of verifying whether the wireless device is an authorized device includes comparing the unique identification of the wireless device to a table of devices authorized to communicate with a computing device upon which the encrypted first file is stored.

15. A computing device comprising:
    a wireless communication unit configured to detect the presence of and communicate with a wireless device in accordance with a near field communication (NFC) protocol; and
    a control unit coupled to the wireless communication unit, the control unit configured to:
    direct the wireless communication unit to transmit a file name of a first encrypted file to the wireless device in accordance with an NFC protocol;
    in response to transmitting the file name of the first encrypted file to the wireless device, to receive from the wireless device, via the wireless communication unit, a first decryption key for the first encrypted file; and
    decrypt the first encrypted file using the first decryption key.

16. The computing device of claim 15, wherein the control unit is further configured to encrypt a first file to generate the first encrypted file, and to decrypt the first encrypted file using hardware.

17. The computing device of claim 15, wherein the control unit is further configured to encrypt a first file to generate the first encrypted file, and to decrypt the first encrypted file using software.

18. The computing device of claim 15, further comprising:
    a file access module controlled by the control unit, the file access module being configured to decrypt the first encrypted file using the first decryption key, and to cause the computing device to provide file information indicating one or more files selectable files including the first encrypted file.

19. The computing device of claim 15, wherein the control unit is further configured to encrypt a first file to (i) generate the first encrypted file with a first encryption key, and (ii) decrypt the first encrypted file in accordance with an asymmetric key algorithm such that the first encryption key is different than the first decryption key.

20. The computing device of claim 15, wherein the control unit is further configured to, prior to the wireless communication unit transmitting the file name of the first encrypted file to the wireless device, (i) receive information from the wireless device in accordance with an NFC protocol, (ii) verify whether the wireless device is an authorized device based upon the received information, and (iii) transmit the file name of the first encrypted file to the wireless device only when the wireless device is authorized.

21. The method of claim 20, wherein the information received from the wireless device uniquely identifies the wireless device, and
wherein the control unit is further configured to verify whether the wireless device is an authorized device by comparing the unique identification of the wireless device to a table of devices stored in memory that are authorized to communicate with the computing device.

22. A non-transitory computer accessible medium in a computing device having stored thereon a set of instructions that, when executed by one or more processors, cause the one or more processors to execute operations comprising:
transmitting a file name of an encrypted first file to a wireless device in accordance with a near field communication (NFC) protocol;
in response to transmitting the file name of the encrypted first file to the wireless device, receiving a first decryption key for the encrypted first file from the wireless device in accordance with an NFC protocol; and
decrypting the encrypted first file using the first decryption key.

23. The non-transitory computer accessible medium of claim 22, wherein the instructions for decrypting the encrypted first file include instructions for decrypting the encrypted first file using hardware.

24. The non-transitory computer accessible medium of claim 22, wherein the instructions for decrypting the encrypted first file include instructions for decrypting the encrypted first file using software.

25. The non-transitory computer accessible medium of claim 22, further including instructions that, when executed by one or more processors, cause the one or more processors to execute operations comprising:
executing a file access application on the computing device; and
displaying file information on the computing device, the file information indicating one or more selectable files including the encrypted first file.

26. The non-transitory computer accessible medium of claim 22, further including instructions that, when executed by one or more processors, cause the one or more processors to execute operations comprising:
executing an asymmetric key algorithm; and
transmitting a first encryption key to the wireless device associated with encryption of the encrypted first file, the first encryption key being different than the first decryption key.

27. The non-transitory computer accessible medium of claim 22, further including instructions that, when executed by one or more processors, cause the one or more processors to execute operations comprising:
prior to transmitting the file name of the encrypted first file to the wireless device:
receiving information from the wireless device in accordance with an NFC protocol;
verifying whether the wireless device is an authorized device based upon the received information; and
transmitting the file name of the encrypted first file to the wireless device only when the wireless device is authorized.

28. The non-transitory computer accessible medium of claim 27, wherein the information received from the wireless device uniquely identifies the wireless device, and wherein the instructions that cause the one or more processors to perform the operations for verifying whether the wireless device is an authorized device further including instructions that, when executed by one or more processors, cause the one or more processors to verify whether the wireless device is an authorized device by comparing the unique identification of the wireless device to a table of devices authorized to communicate with the computing device.

* * * * *